United States Patent [19]
Jones

[11] 3,834,588
[45] Sept. 10, 1974

[54] SAMPLING APPARATUS
[75] Inventor: Robert H. Jones, Fullerton, Calif.
[73] Assignee: Beckman Instruments, Inc., Fullerton, Calif.
[22] Filed: July 18, 1973
[21] Appl. No.: 380,351

[52] U.S. Cl. ................................. 222/61, 222/69
[51] Int. Cl. .......................................... B67d 5/08
[58] Field of Search .................. 222/61, 64, 70, 76; 23/259

[56] References Cited
UNITED STATES PATENTS
3,708,088  1/1973  Lesher ................................. 222/70
3,718,438  2/1973  Anscherlik ........................... 23/259

Primary Examiner—Stanley H. Tollberg
Assistant Examiner—John P. Shannon
Attorney, Agent, or Firm—R. J. Steinmeyer; P. R. Harder

[57] ABSTRACT

Apparatus for selectively delivering measured quantities of liquid from a flowing channel to a storage vessel to produce a composite sample. A container is supplied with a continuous flow of liquid from the channel at a constant level. A dispensing tube has an inlet connected to receive air during vacuum, vent and pressure portions of an operation cycle and an outlet connected to deliver a sample to a recipient system. An air pump has an output connected to supply air under pressure through one conduit to the air lift tube which supplies the liquid from the channel and through a branch conduit to the inlet of the dispensing tube. A transfer vessel operatively connected between the inlet and outlet of the dispensing tube receives liquid from the container during the vacuum portion of the operation cycle at a level above that of the liquid remaining in the dispensing tube from a previous operation cycle. A vacuum regulator unit is operatively connected to the air pump inlet to regulate the vacuum to the dispensing tube and a pressure regulator is operatively connected to the branch conduit to regulate the pressure to the dispensing tubes. Valves responsive to a programmer operate to selectively control the flow of air from the air pump to the dispensing tube during an operation cycle.

15 Claims, 3 Drawing Figures

PATENTED SEP 10 1974 3,834,588

SAMPLING APPARATUS

BACKGROUND OF THE INVENTION

1. Field of the Invention.

This invention relates to liquid sampling devices and more particularly to apparatus and method for providing an accurately measured composite sample to an analyzer from a liquid channel.

2. Description of the Prior Art.

Liquid sampling devices are known in which samples are automatically measured and discharged into a recipient portion of an automatic analyzer system. Because of the increasing importance placed on the chemical treatment of and analyzing of liquid properties of liquids such as present in water channels and streams, there is a continuing need for devices for delivering samples from a stream to an analyzer system where physical properties such as impurities can be analytically analyzed from a composite sample.

In liquid sampling devices in known dispensing devices of this type, typically the forces of gravity are utilized along with apparatus including siphon tubes and the like for receiving a predetermined quantity of liquid from a storage source. The quantity of liquid sample will depend upon the design parameters of the dispensing apparatus and the amount of pressure applied to the system from a source of air pressure.

The presently available devices for sampling liquid such as is present in open channels and rivers require many parts such as liquid pumps, mariotte bulbs and valves which combine to provide an unreliable and inefficient system. For this reason the performance of such apparatus deteriorates by wear and other factors which make the device of limited reliability and totally unacceptable for use in remote locations where access is limited to lengthy periods of time. Moreover these known devices are unable to obtain an accurate sample representing the liquid in a channel as a river.

Various attempts have been made to solve the above noted problems in liquid sampling devices by designing dispensing devices operated by gravity flow and siphon tubes having various types of storage vessels and dispensing tubes. These devices are generally limited to applications having single storage containers from which a sample is to be taken and when utilized with a process stream require many mechanical parts to deliver the liquid in the process stream to the storage device. Accordingly, such devices are deficient in accuracy and reliability to the point of being unacceptable for normal use.

A preferred type of liquid sampling device for use in applications such as process streams would be adaptable to operate in a remote location to sample plant effluents, liquids in open channels, rivers and other flowing streams with a minimum of movable parts so that the operation can operate over a substantial period of time without inspection and repair.

One of the particular problems occurring in the liquid sampling devices known in the art is the inability to provide an accurate representation of the liquid in a channel by way of a composite sample taken from individual samples over a selected period of time. Existing systems with their many mechanical parts and electrically operated devices have been found to be of marginal reliability, especially in remote locations where an automatic analyzer system is present.

A preferred type of liquid sampling device for obtaining a composite sample would be one in which a minimum of parts are provided utilizing only a supply of air along with the forces of gravity to provide a composite liquid sample to a recipient system. The composite sample would be an accurate representation of liquid in the channel over a period of time. In this manner a reliable and efficient device could be utilized that would provide a liquid sample of accuracy and reliability to a remote location.

Accordingly, there is a need for an accurate and reliable liquid sampling device which is able to operate in remote locations without complicated parts which need constant inspection and repair and which also provides an accurate and efficient device for delivering measured quantities of liquid sample to an analyzer without mixing the samples while still maintaining simplicity and reliability of operation.

SUMMARY

In brief, according to the apparatus and method of the present invention, predetermined quantities of liquid samples are delivered to a recipient system from a liquid channel such as a process stream over predetermined periods to produce a composite sample. A container for liquid at a level above the liquid in the channel is responsive to an airlift tube which is operatively connected to the channel to provide a continuous flow of liquid to the container thereby maintaining the level of liquid in the container substantially constant. Thus the liquid in the channel is delivered to the container by means of air pressure.

A dispensing tube having an inlet orifice, a lower bight, a dosing vessel operatively connected between the inlet orifice and one side of the lower bight, a discharge orifice, and a transfer vessel operatively connected between the discharge orifice and the other side of the lower bight is responsively connected to a collecting vessel which receives air under pressure, vacuum and atmosphere from an air supply means. A collecting vessel is operatively connected to the inlet orifice at a level below the level of the discharge orifice and above the top of the transfer vessel. Feed conduit means communicating with the container and the transfer vessel selectively pass liquid from the container to the transfer vessel in response to signals from a programmer.

An air pump is connected to supply air under pressure to the air lift means and under pressure and vacuum to the dispensing tube. The discharge side of the air pump supplies air under pressure to operate the air lift tube when liquid is delivered from the channel to the container.

Pressure and vacuum regulator units in the corresponding pressure and vacuum lines limit the pressure and vacuum to desired levels.

In one embodiment of the present invention, air, during vacuum, vent, and pressure portions of an operation cycle, is supplied through program controlled valves to the dispensing device through the collecting vessel. Vacuum is supplied from the air pump inlet through a valve to the collecting vessel. Vent is supplied to the collecting vessel through a valve opened to atmosphere. Pressure is supplied from the air pump outlet through a valve to the collecting vessel.

The dispensing tube is operatively connected through program controlled valves to deliver a predetermined quantity of liquid to a recipent system. The sole source of power to operate the system is the air pump which provides pressure to the air lift tube to deliver a continuous flow of liquid from the channel to the container and supplies the air under pressure and vacuum to the dispensing tube during each operation cycle. Thus a sampling device is provided which has low power requirements.

In accordance with another primary feature of the invention, a cylinder of gas under pressure may be substituted for the air pump to further minimize the power requirements. According to this feature, the power necessary to operate the programmer and control the solenoid operated valves may be derived from a battery having low power requirements. Such a device is especially adaptable for use in remote locations where the availability of power may be limited.

As another special feature of the invention the sampling device is operated with a minimum of movable parts. The liquid pump, valves and other mechanical parts used in prior systems have been eliminated with water flowing through the entire system commencing from the liquid channel and ending in the recipient system by means of the forces of gravity and pressure from the air pump unly.

According to another primary aspect of the invention, programming means are provided which selectively and accurately provide samples to a recipient system without mixing previous samples by the timely operation of the valves which control the cycles of operation of the dispensing device.

Moreover, as an additional modification, the programmer and valves may be designed to be pneumatically or mechanically operated thereby eliminating entirely the need for a source of electrical power.

BRIEF DESCRIPTION OF THE DRAWINGS

In order that the invention may be more fully understood, a preferred embodiment in accordance therewith will now be described by way of example with reference to the accompanying drawings in which like numerals designate like parts throughout the figures and wherein.

DESCRIPTION OF A PREFERRED EMBODIMENT

Figure 1:
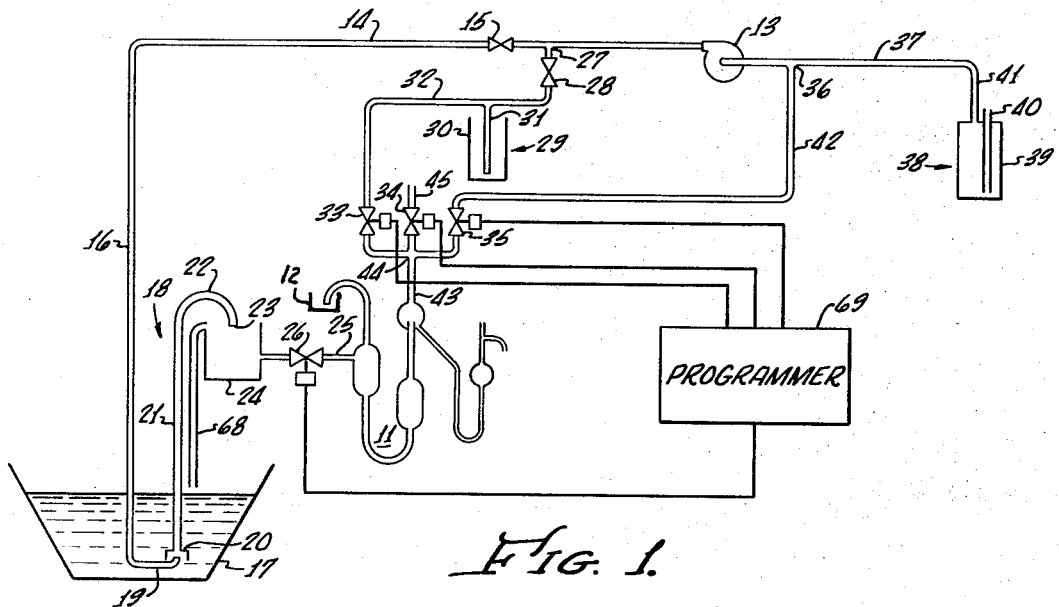
FIG. 1 is a schematic diagram of a sampling device according to the preferred embodiment of the invention.

As illustrated in the schematic diagram of FIG. 1, a dispensing device indicated generally at 11 is connected to dispense a sample of liquid to a receiving vessel 12 of a recipient system during an operation cycle. The dispensing device 11 is operated by air pressure and the forces of gravity to receive liquid from a liquid stored in a container 24 through a feed conduit means 25. An air pump 13 has a discharge end connected to a pressure conduit 14 through a valve 15 which functions to limit the pressure in the conduit 14 at a predetermined value. A branch conduit 16 extends downwardly from the conduit 14 and is submerged in a channel 17 which contains the liquid in a process stream such as a river or the like from which a composite sample is to be taken. An air lift tube 18 comprising a vertically extending leg 21 connected between an upper bight 22 and a lower end 20 has a discharge orifice 23 connected to the upper bight 22 to discharge liquid into the container 24. The bottom part of the leg 16 has a foot or flat section 19 extending therefrom and terminating in an orifice which fits into lower end 20 of the tube 18. The lower end of the tube 18 is flared to provide an easy access to the orifice from the section 19. The air lift tube 18 operates in response to pressure through the leg 16 to cause air and water to flow through the discharge orifice 23 into the container 24. The container 24 operates as a separation chamber to separate the air and the water in the air lift tube 18 as well as the container for the supply of the liquid sample to the dispensing device 11.

Pressure in the line 16 is sufficient to cause the air lift tube 18 to provide a flow of liquid into the container 24 that continuously fills the container and provides a constant head thereto. In this manner the level of liquid in the container 24 is always at a level higher than feed conduit means 25. Overflow from the container 24 may be returned by gravity flow through tube 68.

The air pump 13 has its discharge end connected through branch 27 and valve 28, functioning as a restrictive orifice to regulate pressure in the line, to a pressure feed conduit 32 which is connected through a solenoid operated valve to a conduit junction 44. The inlet end of the air pump 13 is connected through a branch 36 to a vacuum feed conduit 42 which supplies air under vacuum through a solenoid operated valve 35 to the junction 44. The junction 44 is connected through a solenoid operated valve 34 to a vent conduit 45 which is opened to atmosphere.

The degree of vacuum in the conduit 42 is controlled by a vacuum regulator unit 38 which has a closed cylinder 39 having an upper end connected through a tube 41 to the conduit 37. A tube 40 having an upper end open to atmosphere is submerged in the liquid in the cylinder 39. The length of the tube 40 and the level of liquid in the cylinder 39 regulate the vacuum.

The degree of pressure in the conduit 32 is controlled by a pressure regulator unit 29 which includes an open cylinder 30. A tube 31 extends from the conduit 32 into liquid in the cylinder 30. The length of the tube 31 and the level of liquid in the cylinder 30 determine the pressure level.

A programmer 69 is connected to provide control signals to the solenoid valves 26, 33, 34, and 35 during the operation cycle of the device. The programmer 69 is set according to predetermined desired timing controls to open and close the aforementioned valves as necessary to the proper operation of the device.

Figures 2, 3:
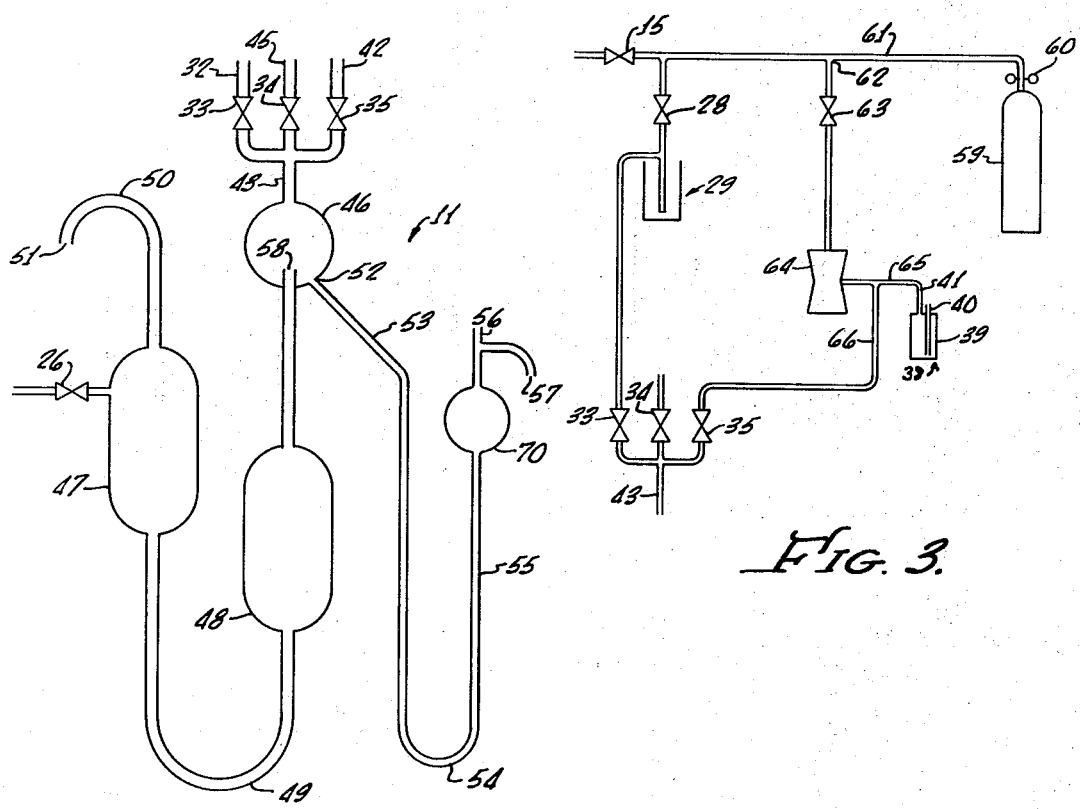
FIG. 2 is a schematic diagram illustrating an enlarged view of the dispensing device of the device of FIG. 1.
FIG. 3 is a modification of the device of FIG. 1 wherein air pressure is supplied from a closed cylinder eliminating the use of a pump.

The dispensing device 11 of FIG. 1 can be more readily seen in the enlarged portion illustrated in FIG. 2. The dispensing device 11 includes a collecting vessel 46 having an upper end connected to the junction 44, which supplies air under pressure, vacuum, and atmosphere during each cycle of operation. The dispensing device 11 is a generally S-shaped configuration having an inlet orifice 58 extending part way into the collecting vessel 46 and a discharge orifice 51 open to the atmosphere and adapted to feed a sample of liquid into a recipient system (not shown) for a cycle of operation. An upper bight 50 has one end connected to the discharge orifice 51 and the lower end connected through a transfer vessel 47 to a lower bight 49. A dosing vessel 48 is operatively connected between the lower bight 49 and the inlet orifice 58 by a vertically extending portion 43.

A siphon has an inlet 52 connected to an opening in the bottom of the collecting vessel 46 and a discharge orifice 57 open to atmosphere. The siphon includes a somewhat crooked elongated portion 53 connected to a lower bight 54 which in turn extends upward through a straight portion 55 and a reservoir vessel 70 to an upper bight 56 and from there to the discharge orifice 57.

Before the actual operation of the device of FIGS. 1 and 2 will be described in detail, a brief description of the liquid operating levels of the various elements of the device will be briefly enumerated. The air pressure in conduit 14 is substantially higher than the pressure in conduit 32 in order to provide sufficient air pressure to properly operate the air lift tube 18 to maintain the level of liquid in container 24 at an overflow condition. The length of the vertical portion 21 depends upon the air pressure available and the desired vertical distance between the liquid channel and the sampling defice. The amount of pressure in the conduit 32 may be much less than that in conduit 14 and is regulated by means of pressure regulator unit 29 to be sufficient to operate the dispensing device. Valves 15 and 28, which may also be restrictive orifices, serve to regulate the differential pressure between conduits 14 and 32. The amount of vacuum in line 42 is regulated by the vacuum regulator 38.

The volume of the transfer vessel 47, the dosing vessel 48 and the collecting vessel 46 depend upon the desired amount of liquid to dispensed. The volume of the reservoir vessel 70 is determined by the length and volume of the siphon tube.

The curvature of the dispensing device tubes and the distance between the bights should be sufficient to insure the liquid in the device maintains a liquid seal against the pressure or vacuum produced in the system by the air supply means. This prevents compressed air inside the dispensing device from bubbling through the device from either of the lower bights 49 or 54.

The discharge orifice 57 of the siphon should be below the level of the input opening 52 to ensure the proper priming and operation of the siphon. As noted hereinbefore the pressure in the conduit 14 must be sufficient to provide enough pressure on the air lift tube 18 to maintain the level of liquid in the container 24 above the conduit 25.

In operation of the device as illustrated in FIGS. 1 and 2, a liquid sample is delivered to a storage vessel (not shown) through discharge orifice 51 of the dispensing device 11 during a complete sampling cycle which consists of vacuum, vent and pressure portions. Initially air pump 13 is connected through valve 15 and conduits 14 and 16 to the inlet 20 of portion 21 to cause a combination of air and water from the channel 17 to flow into container 24. A constant flow of water is maintained causing the container 24 to maintain a constant head above the conduit 25. The programmer 69 provides the necessary signals to the valves 26, 33, 34, and 35 to selectively provide air under vacuum, vent and pressure portions of a cycle and to open and close the valve 26.

The discharge outlet from the pump 13 supplies air under pressure through restrictive valve 28 to the input of valve 33, and the inlet from the pump 13 supplies air under vacuum through conduit 42 to the inlet of the valve 35. The input to valve 34 is air at atmosphere due to the open end of the conduit 45.

Assuming that the system is in operation and a cycle of operation begins with the vacuum portion. Valve 26 is controlled by programmer 69 to open slightly before valve 35 is opened with vacuum to the dispensing device being applied through the collecting vessel 46. Liquid entering the transfer vessel 47 through the conduit 25 flows into the dispensing device. As it is desired to ensure that liquid entering the transfer vessel 47 enters on top of liquid remaining from a previous cycle, the opening of the valve 35 before the opening of the valve 26 causes a vacuum to draw liquid from the transfer vessel 47 before liquid from the new sample enters through conduit 25.

The vacuum created in the conduit 43 and applied through the collecting vessel 46 to the inlet 58 causes the liquid to rise through the transfer vessel 47, lower bight 49 and dosing vessel 48 into the collecting vessel 46 rising to a level somewhat above the vessel 46 depending on the pressure regulator unit 29. As the level of liquid rises in the collecting vessel 46, liquid will flow from the vessel 46 into the siphon entering through the opening 52 through the crooked portion 53, the lower bight 54 and the reservoir vessel 70. The siphon is filled with liquid rising through lower bight 54 and reaching upper bight 56. The liquid rises in the siphon until it drains through orifice 57 thereby flushing out the liquid in the dispensing device as long as the vacuum portion of the cycle continues. Liquid from a previous cycle which remains mixed with liquid from the present cycle in the collecting vessel 46 is continuously flushed out of the discharge orifice 57 until the liquid remaining is almost entirely composed of the liquid from the present cycle.

The vent portion of the cycle then commences with the programmer 69 providing signals to close valve 26 and valve 35 and open valve 34. Removal of the vacuum on the collecting vessel 46 causes the liquid in the vessel 46 to be siphoned through the siphon and discharge through orifice 57.

Valve 34 opens conduit 43 to atmosphere. Liquid is then completely drained from the collecting vessel 46. An equilibrium level is established in the dispensing device at the level of the inlet 58 in the collecting vessel 46 and a corresponding level in the conduit above the transfer vessel 47 leading to the upper bight 50.

A signal from the programmer 69 causes the valve 33 to open and valve 34 to close with pressure being provided through conduit 32 to junction 44 and the inlet 58 through the collecting vessel 46. This pressure pushes the liquid in the dispensing device through the dosing vessel 48, lower bight 49, transfer vessel 47, upper bight 50 and discharge orifice 51 to a recipient system.

At the end of the pressure portion of the cycle, some liquid remains in the dispensing device with the device now ready for a subsequent cycle of operation.

A special feature of the operation of the device of FIG. 1 lies in the accurate and reliable manner in which the measured quantities of liquid from the channel 17 are delivered to a recipient system to provide a composite sample. The dispensing device is particularly adaptable to delivering a precisely measured amount of liquid during the pressure portion of each cycle of operation. Each sample is substantially free of contamination from the previous sample. Thus, in operating the device to provide a composite sample, extreme accuracy and reliability are achieved.

Another feature of the operation of the device of FIG. 1 lies in the use of a single air pump to supply the power to provide the air pressure required to operate the dispensing device as well as being the source of air pressure which operates to lift the liquid stored in the channel to a level where it can be supplied by gravity to the transfer vessel of the dispensing device. Thus expensive and unreliable mechanical devices are eliminated. Moreover the simplicity of operation of the device is readily apparent from the lack of complicated and complex systems of liquid flow systems.

In the dispensing device 11 the location of the liquid in the lower bights 49 and 54 permits the liquid to settle and prevent air from forming. Also movement of the liquid in the bight 49 as during the vacuum or vent portions of the cycle has no effect on the actual dispensing during the pressure portion of the cycle.

FIG. 3 illustrates a modified version of the device of FIG. 1 in which the source of air is derived from an air cylinder 59 under a predetermined pressure. The air from the cylinder 59 is supplied through a suitable regulator 60 through a conduit 61 to the valve 15 to provide the source of air pressure for the air lift tube 18. A branch of the conduit 61 is connected through valve 28 to the inlet of valve 33 to provide the source of air pressure for the collecting vessel 46. A second branch 62 is connected through a restrictive valve to the inlet of a jet pump 64. The pump 64 has a vacuum outlet connected through a conduit 65 to a branch 66 which in turn is connected to supply air under vacuum to the valve 35 for use in the dispensing device. Vacuum regulator unit 38 has a tube 41 extending from the conduit 65 into the cylinder 39 for regulating the vacuum.

The valve 63, responsively connected to the programmer 69 (not shown) is operated for a comparatively short period during each cycle of operation since the vacuum portion of the cycle is of short duration. The jet pump 64 may be of any type pump known in the art which basically operates to create a vacuum on an inlet connected to the side of the pump by reason of the flow of air through the pump.

In operation of the device of FIG. 3 vacuum, vent, and pressure portions of a dispensing cycle of sampling operation are provided in a manner substantially as described for the device of FIG. 1. The air cylinder 59 serves as the only source of air necessary to operate the system. The programmer 69 and solenoid operated valves may easily be operated by a battery. Thus it may be seen that the device of FIG. 3 is particularly useful for applications which desire a small amount of power.

It is to be especially noted that mechanically actuated valves and spring wound programmed controlled motors could easily be substituted for the solenoid operated valves and programmer of FIG. 1. In that event the system could be completely independent of electric power and therefore adaptable for use in remote locations where no power is available.

It should also be noted that the apparatus illustrated in the embodiments is capable of automatic operation with other parts of an analyzer system and is especially adaptable to such a system because of the minimum power requirements.

The elimination of the many parts and power requirements heretofore present in prior art devices opens up entirely new applications for dispensing devices of the type described in the present invention. In water pollution applications, for example, where it is desired to collect composite water samples at remote locations, the device of the present invention may easily be installed with the use of a minimum number of parts and small power requirements. In the device of FIG. 3, for example, only a battery is necessary with the air pressure being provided by a self contained source of air in the pressurized cylinder.

The various vessels, feed conduits, bights, orifices, and valves utilized in the present invention may be of conventional design well known in the art and do not form a particular part of this invention. Of course, it is desired that the vessels, conduits and valves having liquid flowing therein be constructed of materials which resist the corrosive nature of some liquid samples. The programmer may be part of an automatic analyzing system which is coordinated with other programs and functions in a complete system.

Numerous other modifications and changes will be apparent to those skilled in this art. It is intended therefore that the present disclosure be taken as illustrative only of the invention and not limiting of it in any manner.

It is claimed:

1. Apparatus for delivering measured quantities of liquid from a channel comprising:
   a container for storing liquid at a level above the level of liquid in said channel;
   air pressure supply means;
   air lift means responsive to said air pressure supply means and operatively connected to said channel for providing a continuous flow of liquid to said container to maintain the level of liquid in said container substantially constant;
   a dispensing tube including an inlet orifice, a lower bight, a dosing vessel operatively connected between the inlet orifice and one side of the lower bight, a discharge orifice, and a transfer vessel operatively connected between the discharge orifice and the other side of the lower bight;
   a collecting vessel operatively connected to the inlet orifice at a level below the level of the discharge orifice and above the top of the transfer vessel;
   feed conduit means communicating with said storage container and the transfer vessel for selectively passing liquid from said storage container to the transfer vessel;
   a siphon tube having an inlet orifice operatively connected to said collecting vessel and an outlet orifice connected to discharge liquid from said collecting vessel to atmosphere at a level below the level of the dispensing tube inlet orifice and above the dosing vessel; and
   means for selectively providing air under pressure, vacuum, or atmosphere to said collecting vessel.

2. Apparatus as set forth in claim 1 wherein said feed conduit means is operatively connected to provide a sufficient volume of liquid to said transfer vessel for each cycle of operation.

3. Apparatus as set forth in claim 2 wherein said feed conduit means is operatively connected to said air lift means to selectively pass liquid from said channel to said transfer vessel.

4. Apparatus as set forth in claim 1 wherein said air pressure supply means is operatively connected to receive air under pressure from said means for selectively providing air under pressure, vacuum or atmosphere.

5. Apparatus as set forth in claim 1 wherein the level of liquid in said storage container is above the level of said feed conduit means to provide a flow of liquid from said storage container through said feed conduit means to said transfer vessel by gravity means.

6. Apparatus as set forth in claim 1 wherein there is included means for returning the liquid overflow from said container to said channel.

7. Apparatus as set forth in claim 3 wherein said air pressure supply means includes:
a source of air under pressure, a conduit having one end responsively connected to said source of air and the other end submerged in said channel, a horizontal conduit extending from the submerged end of said conduit having an open end adapted to fit in the flared portion of said vertically extending conduit.

8. Apparatus as set forth in claim 1 wherein said means for selectively providing air under pressure, vacuum or atmosphere includes:
an air pump having a discharge outlet connected to supply air under pressure to said air pressure supply means, an inlet connected to supply air under vacuum to said collecting vessel, said discharge outlet further connected to supply air under pressure to said collecting vessel.

9. Apparatus as set forth in claim 1 wherein said feed conduit means includes a solenoid operated valve responsive to a control signal to selectively pass and block the flow of liquid from said storage container to said transfer vessel.

10. Apparatus as set forth in claim 1 wherein said means for selectively providing air under pressure, vacuum or atmosphere includes a cylinder containing air under pressure having an output connected to supply air under pressure.

11. Apparatus as set forth in claim 1 wherein there is included:
a programming means,
a first valve operatively connected to selectively provide air under pressure to said collecting vessel in response to a signal from said programming means;

a second valve operatively connected to selectively provide air under vacuum to said collecting vessel in response to a signal from said programming means;

and a third valve operatively connected between said collecting vessel and atmosphere to selectively provide air under vent to said collecting vessel in response to a signal from said programming means.

12. Apparatus as set forth in claim 11 wherein said air pressure cylinder is the source of power for all of the valves and programming means.

13. Apparatus as set forth in claim 12 wherein is included a fourth valve operatively connected in said feed conduit means for selectively passing liquid from said container to the transfer vessel in response to a signal from said programming means.

14. Apparatus as set forth in claim 13 wherein said second valve is connected to open slightly before said fourth valve from a signal from said programming means.

15. Apparatus as set forth in claim 10 wherein there is included:
a jet pump having an inlet operatively connected to receive air under pressure from said air cylinder;
said jet pump having an outlet connected to supply air under vacuum to said collecting vessel.

* * * * *